UNITED STATES PATENT OFFICE.

SAMUEL CABOT, JR., OF BOSTON, MASSACHUSETTS, ASSIGNOR TO CHARLES W. SLADE, OF SAME PLACE.

IMPROVEMENT IN COMPOSITIONS TO BE USED AS MORDANTS AND DYE-STUFFS.

Specification forming part of Letters Patent No. 204,130, dated May 28, 1878; application filed January 14, 1878.

*To all whom it may concern:*

Be it known that I, SAMUEL CABOT, Jr., of Boston, in the county of Suffolk and State of Massachusetts, have invented certain new and useful Improvements in Mordants; and I do hereby declare the following to be a full, clear, and exact description of the invention, such as will enable others skilled in the art to which it pertains to make and use it.

My invention relates to an improvement in the making of mordants, and is designed to provide an article which will serve to durably fix the desired color or colors upon cloth, yarn, and other similar goods.

The invention consists in a compound of gallic acid, sodic or potassic hyposulphite, hydrosodic or hydropotassic sulphate, and finely-ground nut-galls.

The process of preparing the mordant consists in mixing together the said elements in the parts and proportions as follows:

Twenty pounds of pure gallic acid, made either from a coal-tar product or from a vegetable source; forty pounds of sodic hyposulphite or potassic hyposulphite, also very finely ground; sixty pounds of hydrosodic or hydropotassic sulphate; eight hundred and eighty pounds of ground nut-galls or other equally strong astringent substance.

The above is the recital of my preferred manner of making the mordant; but I do not confine myself to the exact proportions of the different substances thus set forth, as the same may, to some extent, be immaterially changed, and in some instances the above relative proportions may be advantageously departed from in preparing a mordant for use in certain cases.

The well-known property of mordants whereby their twofold action or attraction respectively toward the fiber of the goods to be dyed and the coloring matter used serves as a bond of union between the two, and thus gives fixity to the dyes, obtains in the use of the compound made from the foregoing substances.

This composition is to be used either to produce a slate or drab color with iron salts, or to fix an aniline color. It is to be used upon cotton or mixed cotton and wool material, the latter being either yarn or cloth.

In fixing aniline dyes the composition acts exclusively as a mordant. It is dissolved in water, whereby the hydrosulphate of soda acts as an acid upon the hyposulphite of soda, precipitating sulphur, which latter is an admirable mordant for aniline colors.

As the composition is used in forming a slate or drab color by the aid of iron salts, it acts either as a mordant or as a dye, accordingly as the material may be treated first with the composition, followed by a subsequent treatment of iron salts, in which instance it acts as a mordant; but when the material is first treated with iron salts, and afterward colored by a subjection to the solution of this composition, the latter assumes the part of a dye. In this use of the composition the hydrosulphate of soda reacts upon the nut-galls and the gallic acid, producing a greater tanning effect—that is to say, it releases more effective tannic acid.

I am aware that tannic acid, gallic acid, and nut-galls are in common use for fixing iron and other salts on tissues, and I do not hold any one of the several substances forming the composition as separately my invention, but require the combination of them all in order to produce the latter.

The uniting with gallic acid and nut-galls of the hydrosulphate and hyposulphite of soda effects the double result of increasing the tanning element, and also of providing a precipitated sulphur, which latter is a mordant in itself of great value.

The use of hydrosulphate and sulphate of soda in composition with nut-galls and gallic acid increases the tanning effect.

Having fully described my invention, what I claim as new, and desire to secure by Letters Patent, is—

A mordant consisting of gallic acid, sodic or potassic hyposulphite, hydrosodic or hydropotassic sulphate, and nut-galls, the same being finely ground and thoroughly mixed together, substantially as set forth.

In testimony that I claim the foregoing I have hereunto set my hand.

SAMUEL CABOT, JR.

Witnesses:
HENRY A. SEYMOUR,
A. W. BRIGHT.